(12) United States Patent
Hardesty et al.

(10) Patent No.: US 9,152,494 B2
(45) Date of Patent: Oct. 6, 2015

(54) METHOD AND APPARATUS FOR DATA PACKET INTEGRITY CHECKING IN A PROCESSOR

(71) Applicant: Cavium, Inc., San Jose, CA (US)

(72) Inventors: Jeffrey R. Hardesty, Apex, NC (US); Troy S. Dahlmann, Raleigh, NC (US); Karen A. Szypulski, Cary, NC (US); Jeffrey A. Pangborn, Saratoga, CA (US); Najeeb I. Ansari, San Jose, CA (US); Theodore H. Holler, Cadott, WI (US)

(73) Assignee: Cavium, Inc., San Jose, CA (US)

( * ) Notice: Subject to any disclaimer, the term of this patent is extended or adjusted under 35 U.S.C. 154(b) by 96 days.

(21) Appl. No.: 13/843,782

(22) Filed: Mar. 15, 2013

(65) Prior Publication Data

US 2014/0281834 A1 Sep. 18, 2014

(51) Int. Cl.
*H03M 13/00* (2006.01)
*H04L 1/00* (2006.01)
*H04L 12/00* (2006.01)
*G06F 11/10* (2006.01)
*H04L 12/947* (2013.01)

(52) U.S. Cl.
CPC ........... *G06F 11/1004* (2013.01); *H04L 49/251* (2013.01); *H04L 49/257* (2013.01)

(58) Field of Classification Search
CPC .......................... H04L 49/251; H04L 49/257
See application file for complete search history.

(56) References Cited

U.S. PATENT DOCUMENTS

| | | | | |
|---|---|---|---|---|
| 7,239,645 | B2* | 7/2007 | Suri et al. | 370/412 |
| 7,602,712 | B2* | 10/2009 | Johnsen et al. | 370/231 |
| 7,684,424 | B2* | 3/2010 | Shimizu | 370/413 |
| 7,830,905 | B2* | 11/2010 | Scott et al. | 370/419 |
| 7,934,141 | B2* | 4/2011 | Pope et al. | 714/758 |
| 8,402,343 | B2* | 3/2013 | Radulescu | 714/758 |
| 8,792,497 | B2* | 7/2014 | Rajagopalan et al. | 370/395.3 |
| 8,804,751 | B1* | 8/2014 | Poole et al. | 370/412 |
| 2002/0118692 | A1* | 8/2002 | Oberman et al. | 370/419 |
| 2004/0120333 | A1* | 6/2004 | Geddes et al. | 370/411 |
| 2005/0271073 | A1* | 12/2005 | Johnsen et al. | 370/428 |
| 2014/0169196 | A1* | 6/2014 | Kay | 370/252 |

OTHER PUBLICATIONS

Miyazaki, T.; Murooka, T.; Takahashi, N.; Hashimoto, M., "Real-time packet editing using reconfigurable hardware for active networking," Field-Programmable Technology, 2002. (FPT). Proceedings. 2002 IEEE International Conference on , vol., No., pp. 26,33, Dec. 16-18, 2002.*

\* cited by examiner

*Primary Examiner* — Justin R Knapp
(74) *Attorney, Agent, or Firm* — Hamilton, Brook, Smith & Reynolds, P.C.

(57) ABSTRACT

In an embodiment, a method of handling data packets within a processor includes intercepting, by a hardware packet integrity checking module, one or more data fields associated with a current segment of a data packet being forwarded from a first hardware entity operating in a cut-through mode to one or more processing clusters, where at least one data field of the one or more data fields is indicative of an operation associated with the data packet. At the hardware error detection module, integrity of the current segment of the data packet is checked based on the one or more data fields and parameters corresponding to the operation associated with the data packet. At least one data field of the one or more data fields is modified upon detecting an integrity error. The data fields are forwarded to the one or more processing clusters.

23 Claims, 18 Drawing Sheets

METHOD AND APPARATUS FOR DATA PACKET INTEGRITY CHECKING IN A PROCESSOR

BACKGROUND

The Open Systems Interconnection (OSI) Reference Model defines seven network protocol layers (L1-L7) used to communicate over a transmission medium. The upper layers (L4-L7) represent end-to-end communications and the lower layers (L1-L3) represent local communications.

Networking application aware systems need to process, filter and switch a range of L3 to L7 network protocol layers, for example, L7 network protocol layers such as, Hyper Text Transfer Protocol (HTTP) and Simple Mail Transfer Protocol (SMTP), and L4 network protocol layers such as Transmission Control Protocol (TCP). In addition to processing the network protocol layers, the networking application aware systems need to simultaneously secure these protocols with access and content based security through L4-L7 network protocol layers including Firewall, Virtual Private Network (VPN), Secure Sockets Layer (SSL), Intrusion Detection System (IDS), Internet Protocol Security (IPSec), Anti-Virus (AV) and Anti-Spam functionality at wire-speed.

Improving the efficiency and security of network operation in today's Internet world remains an ultimate goal for Internet users. Access control, traffic engineering, intrusion detection, and many other network services require the discrimination of packets based on multiple fields of packet headers, which is called packet classification.

SUMMARY

According to at least one embodiment, a method of handling data packets within a processor includes intercepting, by a hardware packet integrity checking module, one or more data fields associated with a current segment of a data packet being forwarded from a first hardware entity operating in a cut-through mode to one or more processing clusters, at least one data field of the one or more data fields being indicative of an operation associated with the data packet; checking, at the hardware error detection module, an integrity of the current segment of the data packet based on the one or more data fields and parameters corresponding to the operation associated with the data packet; upon detecting an integrity error, modifying at least one data field of the one or more data fields; and forwarding the one or more data fields to the one or more processing clusters.

According to another embodiment, a hardware integrity checking module for handling data packets being sent from a first hardware entity operating in a cut-through mode to a second entity includes circuit logic. The circuit logic is configured to intercept one or more data fields associated with a current segment of a data packet being forwarded from the first hardware entity to the second entity, at least one data field of the one or more data fields being indicative of an operation associated with the data packet; check an integrity of the current segment of the data packet based on the one or more data fields and parameters corresponding to the operation associated with the data packet; upon detecting an integrity error, modify at least one data field of the one or more data fields; and forward the one or more data fields to the one or more processing clusters.

Detecting an integrity error may include detecting an error indicative of a missing end of packet (EOP) indication in the segment. Modifying at least one data field may include inserting the EOP indication by modifying a corresponding first data field and inserting an indication of an error by modifying a corresponding second data field.

In an embodiment in which the current segment is the first segment in the data packet, detecting an integrity error may include detecting an error indicative of a missing start of packet (SOP) indication in the segment. Modifying at least one data field may include inserting the SOP indication by modifying a corresponding first data field, inserting an end of packet (EOP) indication by modifying a corresponding second data field and inserting an indication of an error by modifying a corresponding third data field.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1:
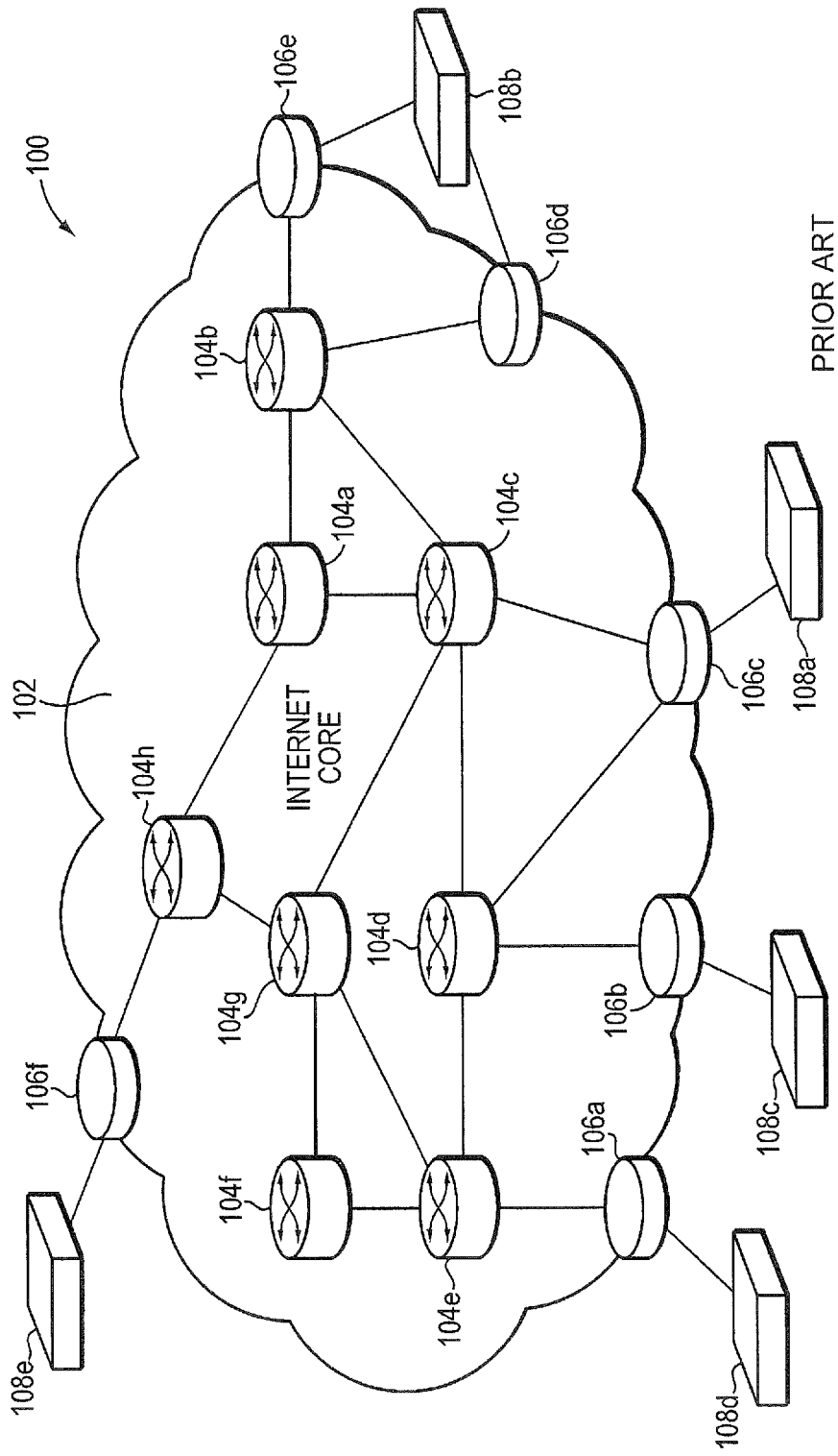
FIG. 1 is a block diagram of a typical network topology including network elements where a search processor may be employed.

A description of example embodiments of the invention follows.

Although packet classification has been widely studied for a long time, researchers are still motivated to seek novel and efficient packet classification solutions due to: i) the continued growth of network bandwidth, ii) increasing complexity of network applications, and iii) technology innovations of network systems.

Increasing demand for network bandwidth and growth in data traffic are being widely observed by many network service providers. Leading service providers report bandwidths doubling on their backbone networks sometimes within six to nine months. As a consequence, novel packet classification solutions are required to handle the exponentially increasing traffics on both edge and core devices.

Complexity of network applications is increasing due to the increasing number of network applications being implemented in network devices. Packet classification is widely used for various kinds of applications, such as service-aware routing, intrusion prevention and traffic shaping. Therefore, handling diverse types of rule sets without significant loss of performance calls for novel intelligent solutions of packet classification.

In addition, new technologies, such as multi-core processors provide unprecedented computing power, as well as highly integrated resources. Given such advanced hardware and software technologies, users also expect high network spend and performance that matches the speed of their devices. The high network performance and speed may be achieved by employing novel intelligent packet classification solutions.

Existing packet classification algorithms trade memory for time. Although the tradeoffs have been constantly improving, the time taken for a reasonable amount of memory is still generally poor.

Because of problems with existing algorithmic schemes, designers use ternary content-addressable memory (TCAM), which uses brute-force parallel hardware to simultaneously check packets against available classification rules. The main advantages of TCAMs over algorithmic solutions are speed and determinism. TCAMs work for all databases.

A TCAM is a hardware device that functions as a fully associative memory. A TCAM cell stores three values: 0, 1, or 'X,' which represents a don't-care bit and operates as a per-cell mask enabling the TCAM to match rules containing wildcards, such as a kleen star '*'. In operation, a whole packet header may be presented to a TCAM to determine which entry, or rule, it matches. However, the complexity of TCAMs has allowed only small, inflexible, and relatively slow implementations that consume a lot of power. Therefore, efficient algorithmic solutions operating on specialized data structures present a valuable alternative. Current algorithmic methods remain in the stages of mathematical analysis and/or software simulation, that is observation based solutions.

Mathematic solutions, proposed in the art, are shown to have excellent time/spatial complexity. However, such methods are typically not implementable in real-life network devices because the mathematical solutions often add special conditions to simplify a problem and/or omit large constant factors which might conceal an explicit worst-case bound.

Proposed observation based solutions employ statistical characteristics observed in rules to achieve efficient solution for real-life applications. However, these algorithmic methods generally only work well with a specific type of packet classification rule sets. Because packet classification rules for different applications have diverse features, few observation based methods are able to fully exploit redundancy in different types of rule sets to obtain stable performance under various conditions.

Packet classification is performed using a packet classifier, also called a policy database, flow classifier, or simply a classifier. A classifier includes a collection of rules or policies. Packets received are matched with rules, which determine actions to take with a matched packet. In generic packet classification, a router classifies a packet on the basis of multiple fields in a header of the packet. Each rule of the classifier specifies a class that a packet may belong to according to criteria on 'F' fields of the packet header. An identifier, e.g., class ID, is associated with each class. For example, each rule in a flow classifier is a flow specification, in which each flow is in a separate class. The identifier uniquely specifies an action associated with each rule. Each rule has 'F' fields. An ith field of a rule R, referred to as R[i], represents an expression or condition to be evaluated with the ith field of the packet header. A packet P matches a particular rule R if, for every i, the ith field of the header of P satisfies the expression or condition R[i]. The expression or condition R[i] may be for testing whether the value of the ith field of the packet header is within a specific value range, testing whether the value of the ith field of the packet header is exactly equal to a specific value, testing whether a value corresponding to a subset of the bits of the ith field of the packet header is equal to a given value, or the like.

Classes specified by the rules may overlap. For instance, one packet may match several rules. In this case, when several rules overlap, an order in which the rules appear in the classifier determines the rules relative priority. In other words, a packet that matched multiple rules belongs to the class identified by the identifier, e.g., class ID, of the rule among them that appears first in the classifier.

Packet classifiers may analyze and categorize rules in a classifier table and create a decision tree that is used to match received packets with rules from the classifier table. A decision tree is a decision support tool that uses a tree-like graph or model of decisions and their possible consequences, including chance event outcomes, resource costs, and utility. Decision trees are commonly used in operations research, specifically in decision analysis, to help identify a strategy most likely to reach a goal. Another use of decision trees is as a descriptive means for calculating conditional probabilities. Decision trees may be used to match a received packet with a rule in a classifier table to determine how to process the received packet.

In simple terms, the problem may be defined as finding one or more rules, e.g., matching rules, that match a packet. Before describing a solution to this problem, it should be noted that a packet may be broken down into parts, such as a header, payload, and trailer. The header of the packet, or packet header, may be further broken down into fields, for example. So, the problem may be further defined as finding one or more rules that match one or more fields of the packet header.

A possible solution to the foregoing problem(s) may be described, conceptually, by describing how a request to find one or more rules matching a packet or parts of the packet, a "lookup request," leads to finding one or more matching rules.

FIG. 1 is a block diagram 100 of a typical network topology including network elements where a search processor may be employed. The network topology includes an Internet core 102 including a plurality of core routers 104a-h. Each of the plurality of core routers 104a-h is connected to at least one other of the plurality of core routers 104a-h. Core routers 104a-h that are on the edge of the Internet core 102, e.g., core routers 104b-e and 104h, are coupled with at least one edge router 106a-f. Each edge router 106a-f is coupled to at least one access router 108a-e.

The core routers 104a-104h are configured to operate in the Internet core 102 or Internet backbone. The core routers 104a-104h are configured to support multiple telecommunications interfaces of the Internet core 102 and are further configured to forward packets at a full speed of each of the multiple telecommunications protocols.

The edge routers 106a-f are placed at the edge of the Internet core 102. Edge routers 106a-f bridge access routers 108a-e outside the Internet core 102 and core routers 104a-h in the Internet core 102. Edge routers 106a-f may be configured to employ a bridging protocol to forward packets from access routers 108a-e to core routers 104a-h and vice versa.

The access routers 108a-e may be routers used by an end user, such as a home user or an office, to connect to one of the edge routers 106a-f, which in turn connect to the Internet core 102 by connecting to one of the core routers 104a-h. In this manner, the edge routers 106a-f may connect to any other edge router 106a-f via one or more of the edge routers 106a-f and one or more of the interconnected core routers 104a-104h.

The search processor described herein may reside in any of the core routers 104a-h, edge routers 106a-f, or access routers 108a-e. The search processor described herein, within each of these routers, is configured to analyze Internet protocol (IP) packets based on a set of rules and forward the IP packets along an appropriate network path.

Figure 2A:
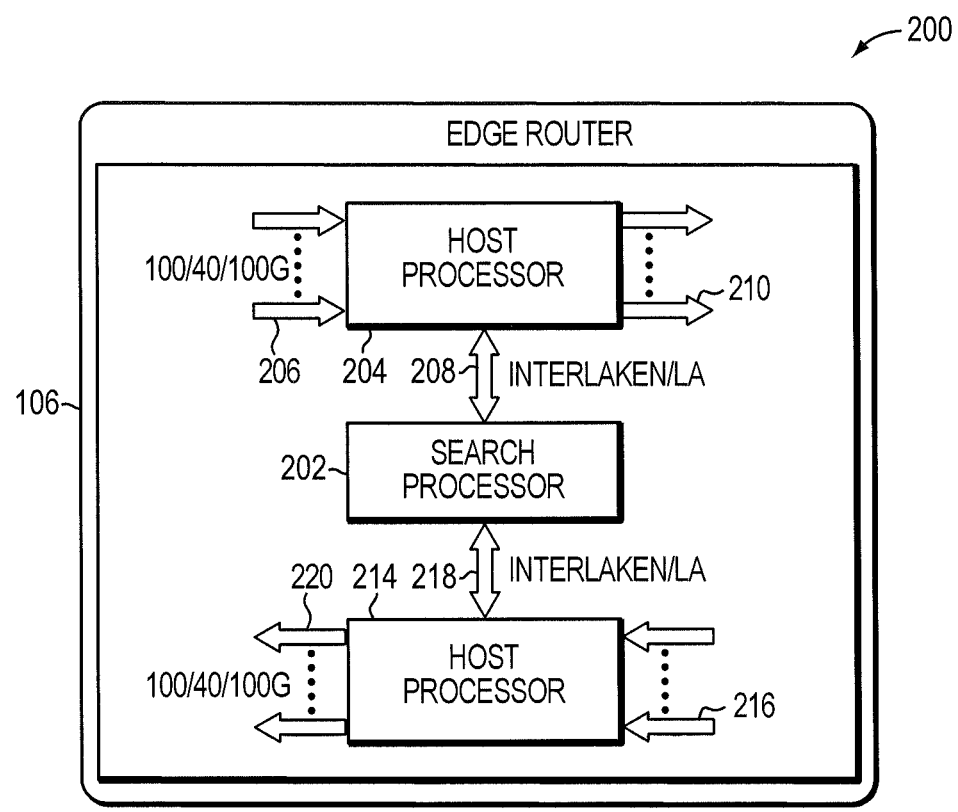
FIGS. 2A-2C show block diagrams illustrating example embodiments of routers employing a search processor.

FIG. 2A is a block diagram 200 illustrating an example embodiment of an edge router 106 employing a search processor 202. The edge router 106, such as a service provider edge router, includes the search processor 202, a first host processor 204 and a second host processor 214. Examples of the first host processor include processors such as a network processor unit (NPU), a custom application-specific integrated circuit (ASIC), an OCTEON® processor available from Cavium Inc., or the like. The first host processor 204 is configured as an ingress host processor. The first host processor 204 receives ingress packets 206 from a network. Upon receiving a packet, the first host processor 204 forwards a lookup request including a packet header, or field, from the ingress packets 206 to the search processor 202 using an Interlaken interface 208. The search processor 202 then processes the packet header using a plurality of rule processing engines employing a plurality of rules to determine a path to forward the ingress packets 206 on the network. The search processor 202, after processing the lookup request with the packet header, forwards the path information to the first host processor 204, which forwards the processed ingress packets 210 to another network element in the network.

Likewise, the second host processor 214 is an egress host processor. Examples of the second host processor include processors such as a NPU, a custom ASIC, an OCTEON processor, or the like. The second host processor 214 receives egress packets 216 to send to the network. The second host processor 214 forwards a lookup request with a packet header, or field, from the egress packets 216 to the search processor 202 over a second Interlaken interface 218. The search processor 202 then processes the packet header using a plurality of rule processing engines employing a plurality of rules to determine a path to forward the packets on the network. The search processor 202 forwards the processed ingress packets 220 from the host processor 214 to another network element in the network.

Figure 2B:
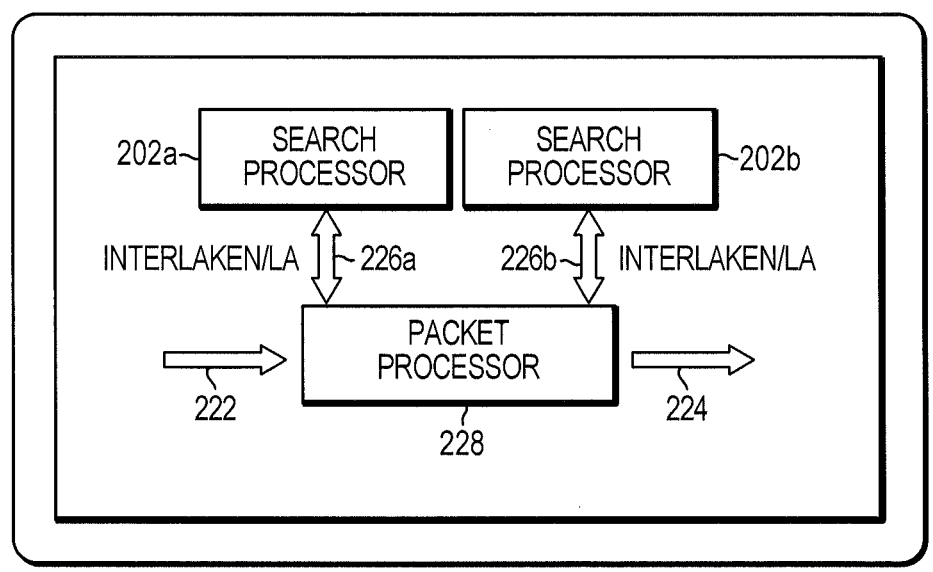

FIG. 2B is a block diagram illustrating another example embodiment of an edge router 106 configured to employ the search processor 202. In this embodiment, the edge router 106 includes a plurality of search processors 202, for example, a first search processor 202a and a second search processor 202b. The search processors 202a-b are coupled to a packet processor 228 using a plurality of Interlaken interfaces 226a-b, respectively. Examples of the packet processor 228 include processors such as NPU, ASIC, or the like. The plurality of search processors 202a-b may be coupled to the packet processor 228 over a single Interlaken interface. The edge router 106 receives a lookup request with a packet header, or fields, of pre-processed packets 222 at the packet processor 228. The packet processor 228 sends the lookup request to one of the search processors 202a-b. The search processor, 202a or 202b, searches a packet header for an appropriate forwarding destination for the pre-processed packets 222 based on a set of rules and data within the packet header, and responds to the lookup request made by the packet processor 228. The packet processor 228 then sends the post processed packets 224 to the network based on the response to the lookup request from the search processors 202a or 202b.

Figure 2C:
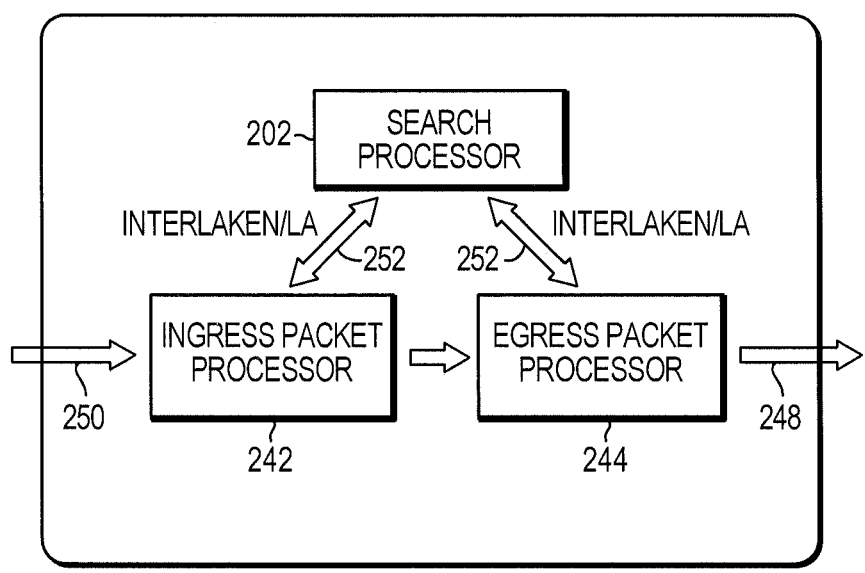

FIG. 2C is a block diagram illustrating an example embodiment of an access router 246 employing the search processor 202. The access router 246 receives an input packet 250 at an ingress packet processor 242. Examples of the ingress packet processor 242 include OCTEON processor, or the like. The ingress packet processor 242 then forwards a lookup request with a packet header of the input packet 250 to the search processor 202. The search processor 202 determines, based on the packet header in the lookup request, a forwarding path for the input packet 250 and responds to the lookup request over the Interlaken interface 252 to the egress packet processor 244. The egress packet processor 244 then outputs the forwarded packet 248 to the network.

Figures 3A, 3B:
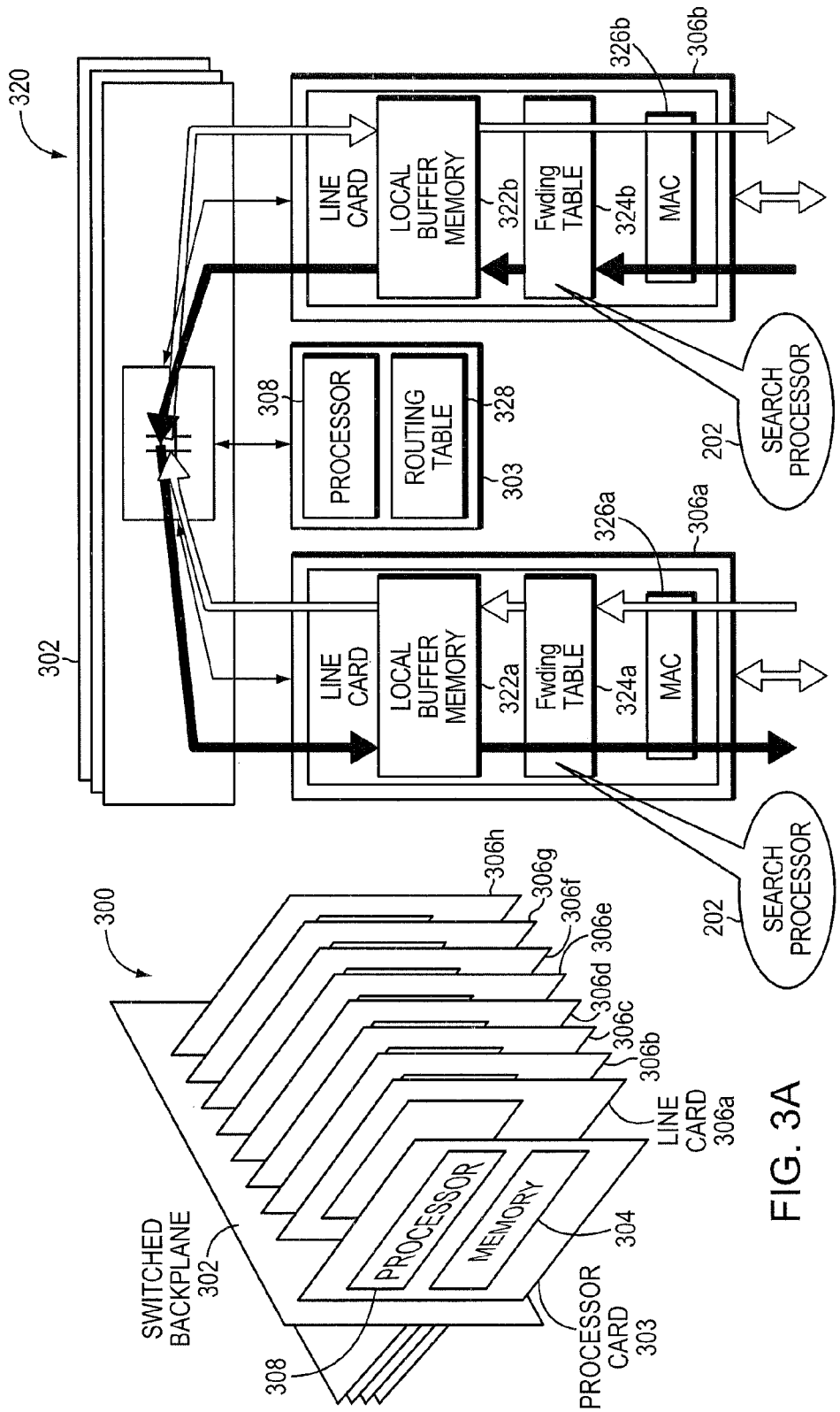
FIG. 3A is a diagram of an example embodiment of a router architecture.
FIG. 3B is a block diagram illustrating an example embodiment of a router employing a search processor.

FIG. 3A is a diagram 300 of an example embodiment of a router architecture. The router architecture includes a switched backplane 302 coupled with a processor card 303 that includes a processor 308 and a memory 304. The switched backplane 302 is further coupled with a plurality of line cards 306a-h. Each line card 306a-h includes a search processor as described herein.

FIG. 3B is a block diagram 320 illustrating an example embodiment of a router employing the search processor 202. The router includes the switched backplane 302 which is coupled to the line cards 306a-b and the processor card 303. The processor card 303 includes a processor 308 and a routing table 328, which can be stored in the memory 304 of the processor card 303. Each line card 306a-b includes a respective local buffer memory 322a-b, a forwarding table 324a-b, and a media access control (MAC) layer 326a-b. The search processor 202 exists within the forwarding table 324a-b of the line card 306a-b.

As an example, a packet is received by the line card 306a at the MAC layer 326a. The MAC layer 326a sends the packet to the forwarding table 324a. Then, the packet and appropriate forwarding table information is stored in the local buffer memory 322a. The processor card 303 then accesses its routing table 328 to determine where to forward the received packet. Based on the determination, the router selects an appropriate line card 306b, stores the packet and forwarding information in the local buffer memory 322b of the appropriate line card, and forwards the packet out to the network.

Figures 3C, 3D:
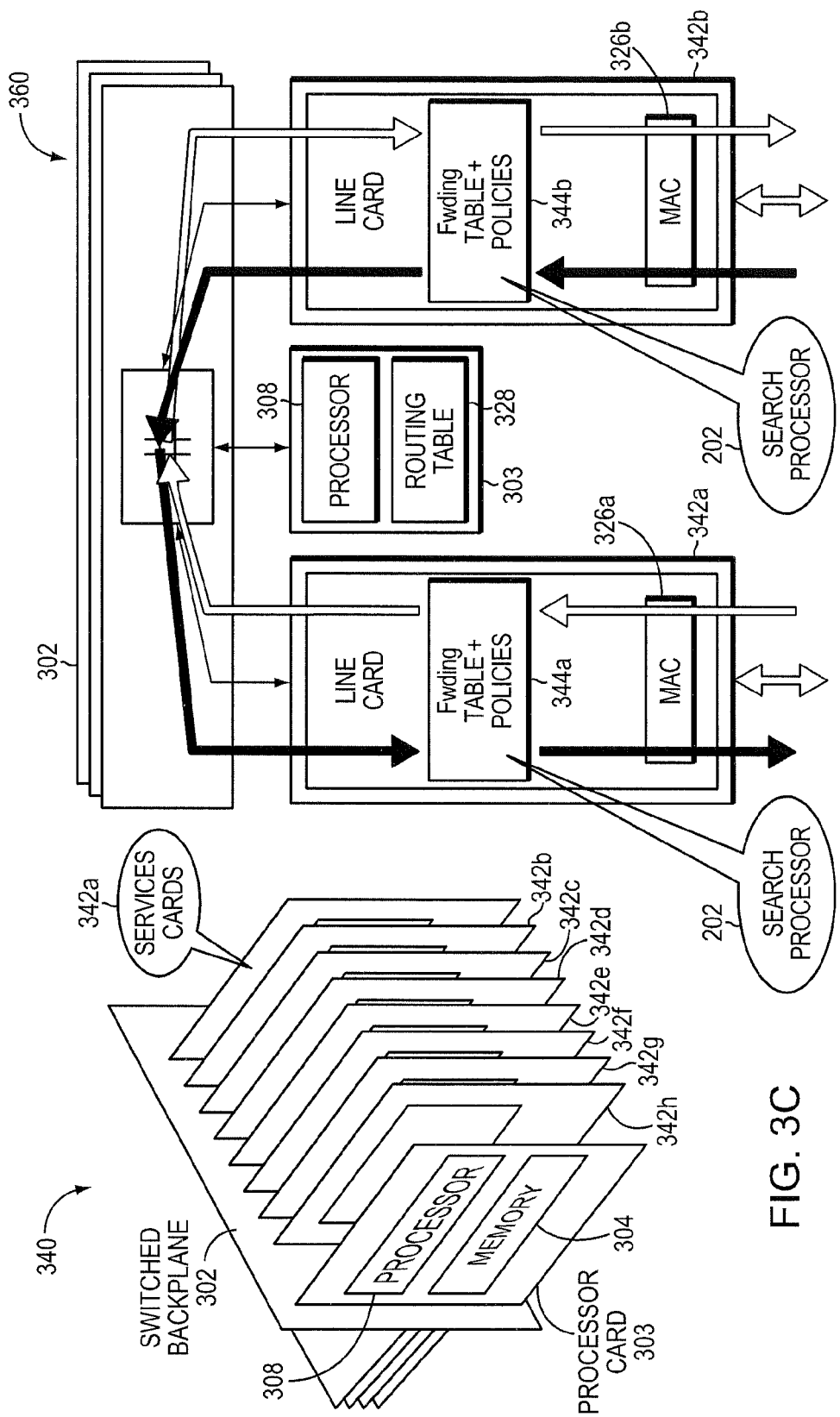
FIG. 3C is a block diagram of another example embodiment of a router architecture.
FIG. 3D is a block diagram illustrating another example embodiment of a router employing a search processor.

FIG. 3C is a block diagram 340 of another embodiment of a router including the switched backplane 302. The switched backplane 302 is coupled to the processor card 303, the line cards 342b-h, and a services card 342a. The processor card 303 includes the memory 304 and the processor 308. The service card 342a is a type of line card 342a-h. Further, the search processor described herein can also exist on the service card 342a.

FIG. 3D is a block diagram 360 illustrating an example embodiment of a router employing the switched backplane 302. The switched backplane 302 is coupled with the processor card 303 and the service card 342a or line cards 342b-h. The line cards 342a-b can either be services card 342a or line cards 342b-h. The line card 342a-b includes a forwarding table and corresponding policies module 344a-b, and a MAC layer 326a-b. The search processor 202 is included in the line card 342a-b. The line card 342a receives a packet from a network through the MAC layer 326a at the forwarding table and policies module 344a. The search processor 202 processes the packet according to the forwarding table and policies module 344a according to the routing table 328 in the processor card 303 and forwards the packet to an appropriate line card 342b to be forwarded into the network.

Figure 4:
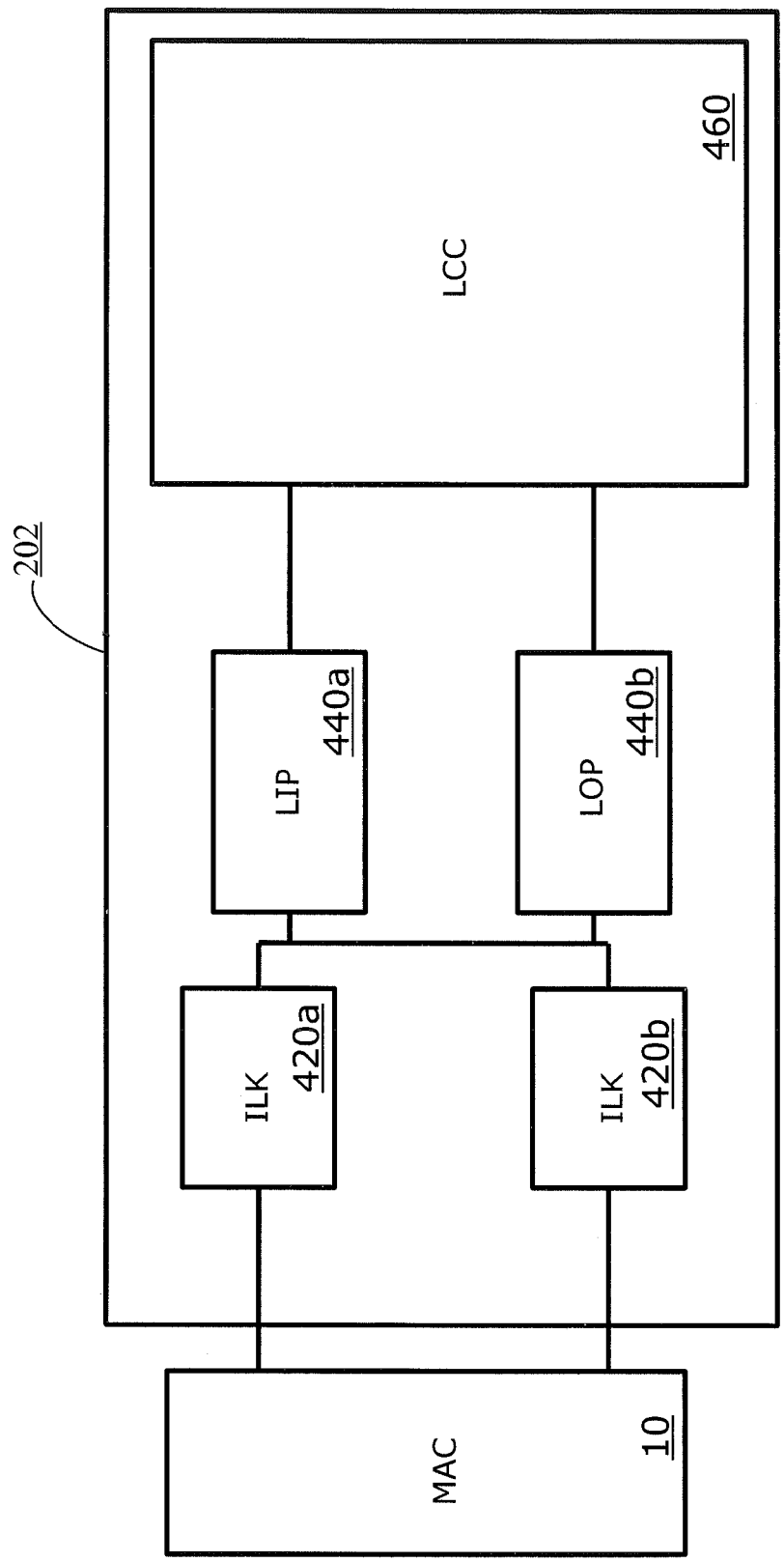
FIG. 4 is a block diagram of an example embodiment of a search processor.

FIG. 4 is a block diagram 400 illustrating an overview of the architecture of the search processor 202, according to at least one example embodiment. The search processor 202 is coupled with a media access control (MAC) layer processor 10 configured to provide addressing and channel access control mechanisms. The search processor 202 includes, among other things, a lookup cluster complex (LCC) 460. The LCC 460 includes one or more search clusters. A search cluster is a search block including a plurality of processing engines and an on-chip memory (OCM) component. The processing engines are configured to search for rules in a corresponding OCM component, given a request, that match keys for packet classification. The processing engines may also include engine(s) configured to manage transport of data between different components within the memory cluster. According to at least one example embodiment, the search clusters in the LCC 460 may be grouped into one or more super clusters.

The search processor 202 also includes an interface, e.g., Interlaken LA interface, 420a and 420b to receive requests from a host processor, e.g., 204, 214, 228, 242, or 244, and to send responses to the host processor. According to at least one example embodiment, a request may be in the form of a data packet with an indication of a requested operation to be performed by at least one search cluster. The search processor 202 also includes two Lookup Front-end (LUF) processors 440a and 440b configured to process, schedule, and order the requests and responses communicated from or to the interface. For example, one LUF processor 440a is acting as a LUF input processor (LIP) while the other is acting as a LUF output processor (LOP) 440b. The LIP processor 440a handles data packets directed to the LCC 460 from the interface 420a and 420b. The LOP processor 440b handles data packets directed to the interface 420a and 420b from the LCC 460.

In a typical store and forward mode, data segments are first stored in a buffer of the system. The data segments are then retrieved, e.g., one at a time, and processed. Once processed, a data segment may be stored again, and then retrieved and forwarded to a next destination. In cut-through mode, however, a data segment is processed on the fly and sent to the corresponding destination, for example, before even receiving other data segments associated with the same data packet. According to at least one example embodiment, the LIP processor 440a operates in cut-through mode. In other words, data segments associated with a data packet are not saved and then forwarded to the LCC 460. Rather, the data segments are processed and passed by the LIP processor 440a on the fly. As such, no storing delay is caused at the LIP processor 440a.

Cut-through mode is typically employed in non error-prone environments. However, in the search processor 202, data directed to the LIP processor 440a from the MAC processor 10 may be subject to errors, for example, at the interface 420a and 420b. While the cut-through mode enhances processing speed and avoids buffering delays, some packet errors may cause even more significant delay and buffer overflow at the LCC if not resolved properly.

Different operations or commands may be associated with data packets of different sizes. The command may be a read-command, a search-command, a write-command, or the like. The search cluster (LCC) is typically not configured to handle a data packet with an erroneous size that does not match the respective command. Packet size errors may cause one command to masquerade as a different command. Also, a packet size error may also cause two consecutive data packets to appear as a single data packet. In such a case, a respective receiving buffer in a search cluster may experience data overflow due to unexpectedly large packet size. Since the LIP processor 440a operates in a cut-through mode, an erroneous packet size may be detected after processing and sending one or more segments of the same data packet to the LCC 460.

According to at least one example embodiment, a hardware packet integrity checking, or error detection, module is employed at the output of the LIP processor 440a or between the LIP processor 440a and the LCC 460. The packet integrity checking module is configured to detect and address errors in a data packet segment on the fly. According to at least one example embodiment, the packet integrity checking module is configured to cause no delay in the data flow when checking for, and addressing, any errors in a data packet segment. According to at least one scenario, a data packet segment is a beat. A beat is a set of bits received in a single data clock cycle. In an example implementation of the search processor, a beat includes 64 bits. A person skilled in the art should appreciate that a beat may include any number of bits.

Figure 5:
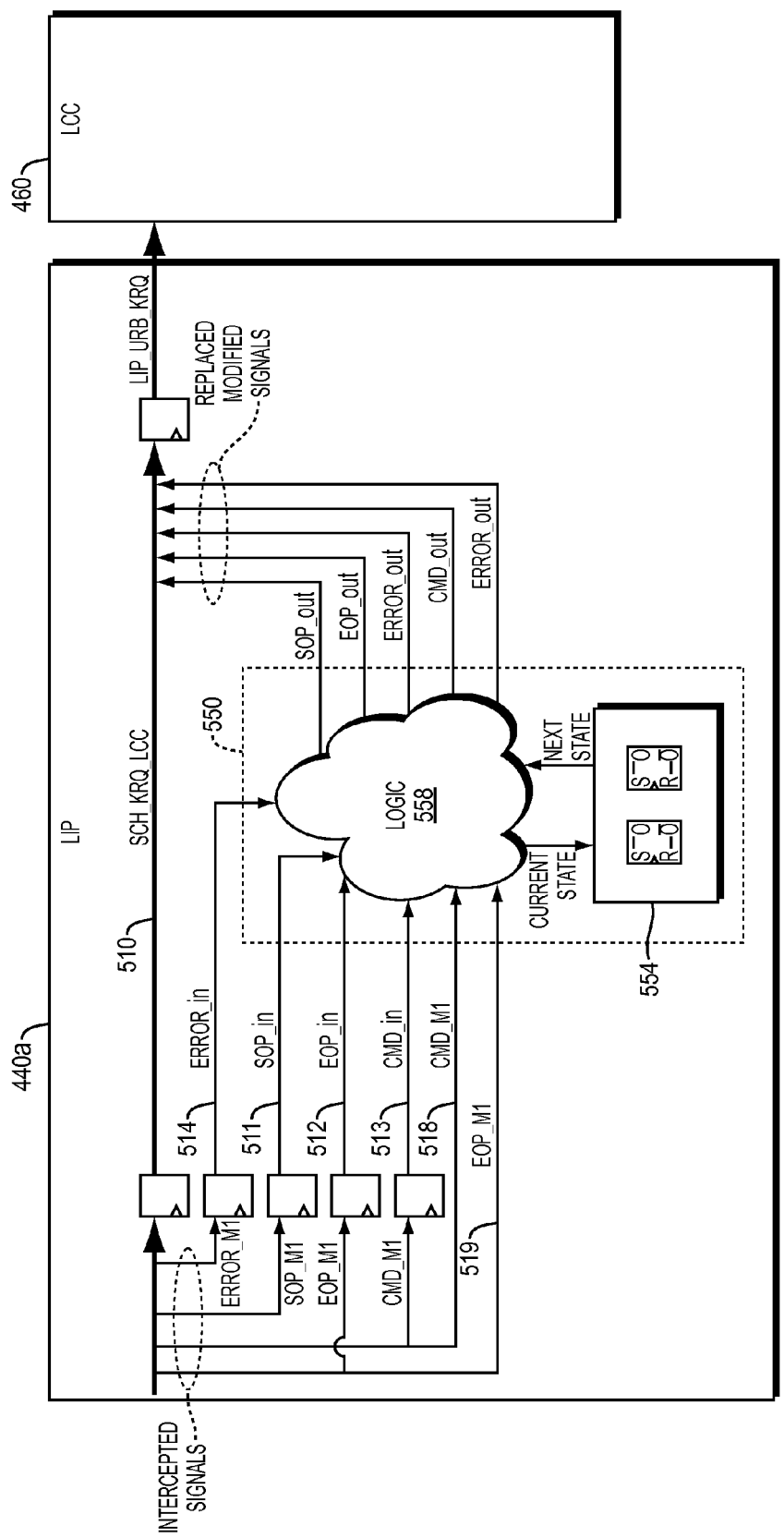
FIG. 5 is an example embodiment of an integrity checking module.

FIG. 5 is an example embodiment of the integrity checking module 550. The integrity checking module 550 is configured to intercept data fields in a current beat of a data packet. The data fields are, for example, routed through the integrity checking module 550. The data fields are, for example, encoded in a command, or operation, code. The data fields include, for example, a start-of-packet (SOP) field 511, an end of packet (EOP) field 512, a command indicator (CMD) field 513, and an error field 514. Each of the SOP 511 and EOP 512 fields may be a single-bit flag. The error field 514 is, for example, a two-bit field. The two-bit error field values include "00" indicative of no error, "01" indicative of a correctable error, "10" indicative of a non-correctable error, and "11" indicative of a fatal error. The CMD field 513 may be a multi-bit field. A person skilled in the art should appreciate that the data fields may be designed differently.

The integrity checking module 550 includes a beat counter 554 configured to monitor the data fields in the command code and count the beats sent associated with a current data packet. The integrity checking module 550 also includes a circuit logic 558 configured to detect any address errors in a beat of a data packet currently being sent. Specifically, in case of a detected error, the circuit logic 558 is configured to modify one or more of the intercepted data fields, based on the detected error, and insert the intercepted data fields, with the applied modification(s), in the respective beat. If the detected error causes a reduction in the size of the respective data packet, the circuit logic 558 may be further configured to append the data packet with additional beats to compensate for the reduction in the packet size due to the detected error.

The integrity checking module 550 is configured to intercept, for example a next CMD field 518 and a next EOP field 519 of a next beat. According to at least one example embodiment, the integrity checking module 550 is coupled to an output interface of the LIP processor 440a. The integrity checking module 550 may also be coupled to at least one internal component of the LIP processor 440a, and have access to a beat being processed within the LIP processor 440a.

Figure 6:
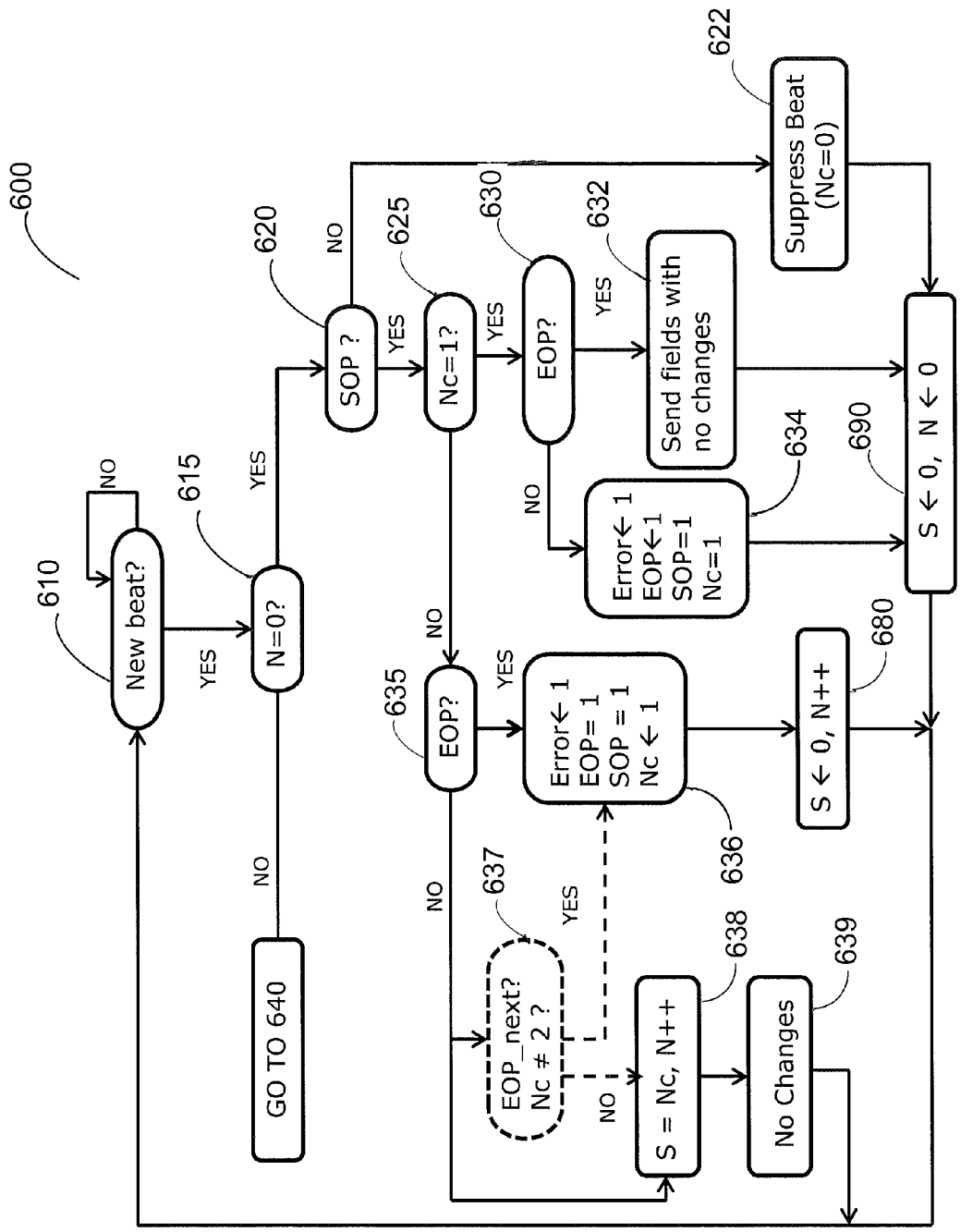
FIG. 6 is a flowchart illustrating finite state machine logic, employed at the integrity checking module, according to at least one example embodiment.
Figure 6:
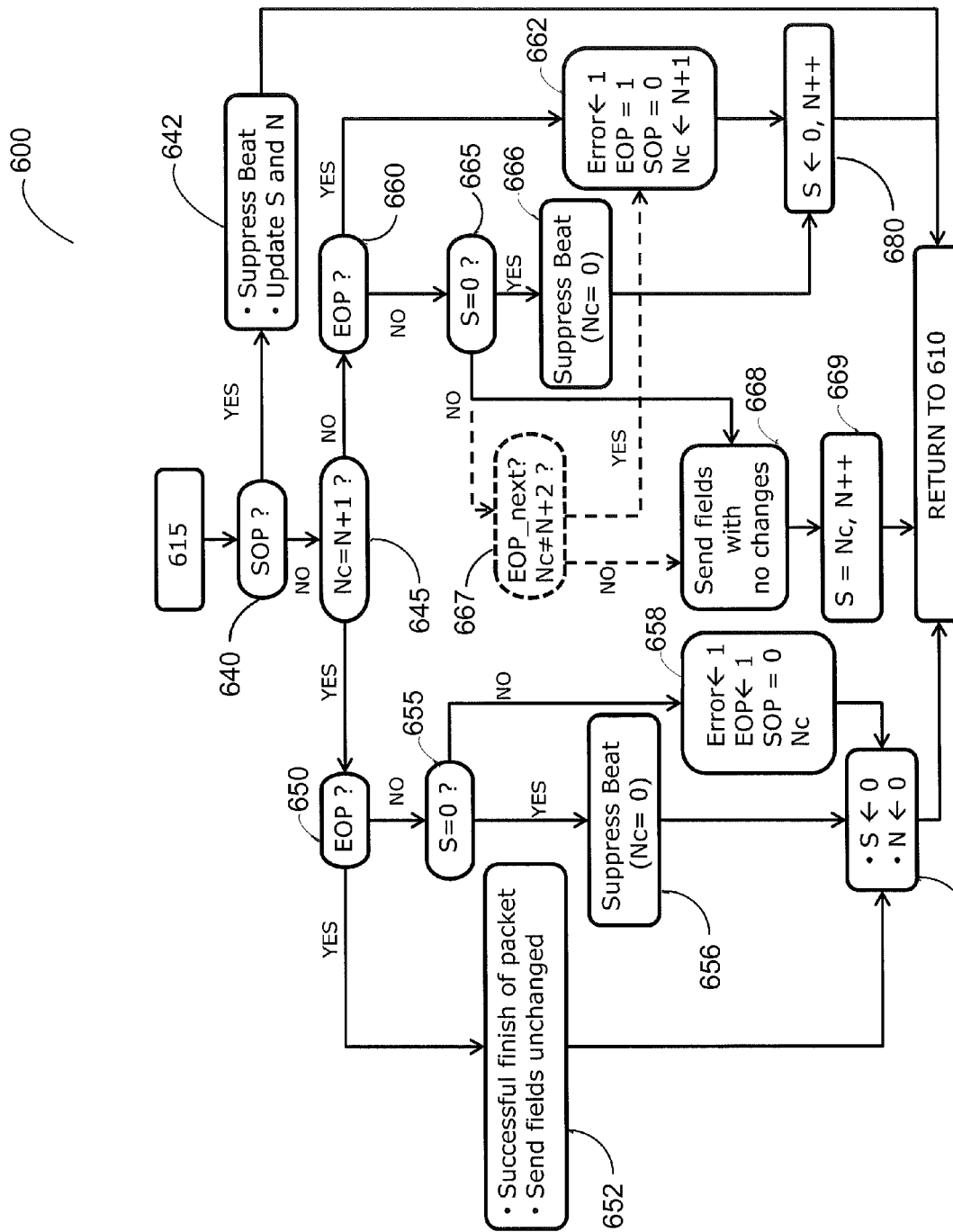

FIG. 6 is a flowchart illustrating a finite state machine (FSM) logic 600, employed at the integrity checking module 550, according to at least one example embodiment. At the block 610, the integrity checking module 550 waits for a beat, or segment, to be detected. A beat may be detected based on respective intercepted data fields. When the integrity checking module 550 is started or reset, it starts at the block 610. In the context of FIG. 6, S is a state parameter, indicating whether a current state is idle, e.g., S=0, or a packet having Nc beats is being processed. The total expected number of beats Nc in a packet may be known to the integrity checking module based on the intercepted CMD field. The number N is a counter of beats, associated with a given packet, processed by the integrity checking module 550. When started or reset, the FSM logic 600 updates the state and counter values as S=0 and N=0. Upon detecting a first data beat, or segment, corresponding to a current packet being sent over the channel 510, the FSM logic 600 does not update the state and counter values S and N until the detected beat is accepted by the FSM logic 600 as being a first beat in the packet. According to an example scenario, a beat is detected when respective data fields, e.g., 511-514, are intercepted or received by the integrity checking module 550. The integrity checking module 550 may receive only the data fields, e.g., 511-514, used in the process described by the FSM logic 600. Alternatively the whole beat may be routed through the integrity checking module 550.

In order to determine whether an indication of a SOP is expected, the integrity checking module 550 checks, at block 615, whether the detected beat is a first beat in a packet, e.g., whether N=0, or not. Note that if the detected beat is a first beat in a packet the state S and the counter N are not updated yet and still indicate that no packet is recognized yet by the FSM logic, e.g., S=0, and no beat is processed and recognized as valid beat yet, e.g., N=0. If the detected beat is determined to be the first in a packet, e.g., N=0, a determination is made, at block 620 whether the detected beat includes an indication of a SOP, e.g., SOP=1. If no indication of SOP is found in the detected beat, e.g., SOP=0, the beat is erroneous. As such, at block 622, the detected beat is suppressed. Specifically, the CMD field 513 is modified to indicate that no command is being sent in a packet or that the channel 510 is in idle state. For example, the intercepted data fields may be replaced with Error=0, SOP=0, EOP=0, and CMD=IDLE. Note that Nc=0, or a zero-beat packet, is to be interpreted as indicative of the idle state. In order to indicate that the data packet is processed completely, the state value is reset, e.g., S=IDLE or S=0, at block 690, and the beat counter is reset, e.g., N=0. After updating the state S and the beat counter N, at block 690, the finite state machine 600 returns back to the block 610.

If the detected beat is determined, at block 620, to include a SOP, e.g., SOP=1, the integrity checking module 550 checks, at block 625, whether the respective packet is a one-beat packet, e.g., whether Nc=1. If Nc=1, an EOP indication is expected at the same beat. At block 630, the integrity checking module checks the value of the intercepted EOP field 512. If EOP=1, then no error is detected in the one-beat packet. As such, at block 632, the intercepted data fields 511-514 are routed back unchanged to the channel 510 toward the LCC 460. In order to indicate that the data packet is processed completely, the state S is reset, e.g., S=IDLE or S=0, and at block 690, and the beat counter N is also reset, e.g., N=0. After updating the state S and the beat counter N, at block 690, the finite state machine 600 returns back to the block 610. If at the block 630 no EOP is detected, e.g., EOP=0, the error field is modified to indicate a detected error, e.g., error=1, and the EOP is modified, e.g., EOP=1, to indicate an end of the packet corresponding to the detected beat. The CMD field is kept unchanged to indicate a one-beat packet and the SOP is not modified, e.g., SOP=1. By indicating that an error is detected, the packet is received at the LCC 460 and treated as an erroneous packet. The intercepted data fields are then forwarded over the channel 510 to the LCC 460. According to at least one example embodiment, in forwarding the data fields, e.g., 511-514, the integrity checking module 550 does not introduce a delay and the data fields, e.g., 511-514, reach the LCC 460 in synchronization with other data of the beat that was not intercepted by the integrity checking module 550.

If the data packet corresponding to the detected beat is determined, at the block 625, to be a multi-beat packet, e.g., Nc≠1, the integrity checking module 550 determines at the block 635 whether the detected beat includes an indication of end of packet, e.g., whether EOP=1. If the detected beat includes an indication of an EOP, e.g., EOP=1, the detected EOP is erroneous. As such, at block 636, the packet is forced to be a single-beat packet, e.g., Nc=1 or CMD=1-beat command. In addition, the error data field is modified to indicate a detected error, e.g., error=1. The SOP and the EOP may be kept unchanged. The data fields are then forwarded over the channel 510 toward the LCC 460. Given that the data packet is forced to be a single-beat packet, other beats corresponding to the original are still expected to be sent in one or more following clock cycles. These other beats are to be suppressed. Hence, at block 680, the state is updated to indicate that the FSM logic 600 is done processing the packet, e.g., S=0. As such, following beats in the original packet will be suppressed. The beat counter N is incremented, at the block 680, to help the finite state machine 600 to recognize that at least one following beat is to be suppressed. After updating the state S and the counter N, at block 680, the finite state machine 600 returns back to the block 610.

If it is determined at the block 635 that the detected beat does not include an indication of an EOP, e.g., EOP=0, the integrity checking module 550 may look ahead and check at least one data field associated with the next beat. The integrity checking module 550 is configured to intercept, for example, the next EOP field 519 of the next beat. The integrity checking module 550 may also intercept the next CMD field 518 of the next beat. At block 637, the integrity checking module determines whether the next beat includes an indication of an end of packet. If it is determined at the block 637 that EOP_next=1 in the next beat and that the next beat is not the last in the packet, e.g., Nc≠2, the packet is forced to be a 1-beat packet, e.g., Nc=1, or CMD=1-beat command, and the error field is modified to indicate an error, e.g., error=1, at the block 636. The following beats of the original packet will be treated as beats to be suppressed. If EOP_next≠1 or Nc=2, the counter N is incremented, at the block 638, and the state S is updated, e.g., S=Nc, to indicate a Nc-beat packet is being processed by the FSM logic 600. The intercepted data fields are then forwarded unmodified, at the block 639 over the channel 510 toward the LCC 460. By sending the intercepted data fields without modification, the integrity checking module 550 recognized that the current beat is an authentic beat of a multi-beat packet or command. From the block 639, the FSM 600 goes back to the block 610. A person skilled in the art should appreciate that the block 637 is optional depending on the implementation of the FSM logic 600.

If at the block 615 it is determined that the current detected beat is not the first in the respective packet, e.g., N≠0, the FSM moves to the block 640 where it is checked whether or not the current beat includes an indication of a start of packet. If SOP=1, the beat is dropped and the state S and the counter N are updated at 642. The state S and the counter N are updated according to block 680 or block 690 based on whether or not the beat is the last in the packet or not. From block 642, the integrity checking module 550 goes back to the block 610 where it waits for new beat to be detected.

If the SOP=0, the integrity checking module 550 checks at the block 645 whether the current beat is the last in the current packet. If the current beat is the last beat in the current packet, e.g., Nc=N+1, the EOP is checked at the block 650. If it is found that EOP=1 at the block 650, the integrity check module recognizes at 652 a successful finish of the packet and sends the intercepted data fields of the current beat unmodified. Then, the state S and the counter N are reset at the block 690 and the FSM 600 returns to the block 610 to wait for new beat of a new packet. If no EOP indication is detected, e.g., EOP=0 at the block 650, the current state S is checked at the block 655. If an idle state is detected, e.g., S=0 or S=IDLE, at the block 655, the current beat is suppressed, at the block 656, by modifying the CMD field to indicate an idle channel, e.g., CMD=IDLE or CMD=zero-beat command. Then the state S and the counter N are reset at the block 690 and the FSM 600 returns to the block 610. If the state at block 655 is determined to indicate that a packet is being processed, e.g., S≠0, the integrity checking module 550 recognizes at the block 658 that the current beat, which is the last in the packet, is erroneous because lacks an indication of an EOP, e.g., EOP=0. The integrity checking module 550 sets EOP=1 and Error=1 and sends the intercepted data fields, after modification, back over the channel 510 toward the LCC 460. The data fields SOP 511 and CMD 513 may be sent unchanged. As such the current beat is caused to be treated as erroneous at the LCC 460. The state S and the counter N are then reset at the block 690. Once the state and the counter are updated, the FSM 600 returns back to the block 610.

By suppressing a beat, the integrity checking module causes the beat to be dropped at LCC 460. If a packet is forced to be of size K, where K<Nc, the betas after the $K^{th}$ beat are suppressed. However, beats with detected errors, e.g., error=1, may be received and treated as erroneous. Erroneous commands or packets may not be processed at the LCC 460.

At the block 645 it is determined that the current beat is not the last in the current packet, e.g., N≠Nc, the intercepted EOP field 512 of the current beat is checked at the block 660. If an EOP is detected at the block 660, e.g., EOP=1, the packet size is forced to be equal to the counter, e.g., Nc=N, at the block 662. Specifically, the current beat is now signaled to be the last in the packet, e.g., EOP=1 and the command is forced to be CMD=N-beat command. An error is also signaled by setting, for example, Error=1. The intercepted data fields are sent back in the channel 510 toward the LCC 460. The state S is then reset at 680 and the counter N is incremented, which helps the FSM 600 to recognize that the following beat as a beat to be suppressed. After the state S is reset and the counter N is incremented at 680, the integrity checking module returns to the block 610.

If no indication of an EOP is detected at the block 660, the state S is checked at the block 665. If S indicates an idle state, e.g., S=0 or S=IDLE, the beat is suppressed, e.g., CMD=IDLE or CMD=zero-beat command, at the block 666 and processing moves to the block 680. However, if S indicates a non-idle state, e.g., a packet with a given number of beats is being processed, the intercepted fields are sent unchanged, at the block 668, over the channel 510 toward the LCC 460. The FSM logic 600 then increments the counter N and keeps the state S unchanged at block 669. The FSM logic then returns to block 610 to wait for the next beat in the current packet. The process at the block 667 is optional and is similar to that of block 637. Specifically, the FSM logic 600 checks whether EOP_next=1 and whether the packet has N+2 beats, at the block 667, and if that's the case the FSM logic 600 goes to execute the process in block 662.

In the blocks 634, 636, 638, or 662, instead of forcing the command to be an N-beat command, the integrity checking module 550 may keep the CMD field unchanged and append the data packets with the remaining beats. For example, the integrity checking module 550 produces and sends Nc-N beats while still signaling an error in the Error data field.

A person skilled in the art should appreciate that in FIG. 6, the counter N refers to the last beat processed in the packet till the counter is incremented. A person skilled in the art should also appreciate that the FSM logic 600 may be implemented in different ways. In general, the integrity checking module 550 is configured to perform a method of handing data packets within a processor, or processing system. The method includes intercepting, by the packet integrity checking module 550, one or more data fields associated with a segment of a data packet being forwarded from a first hardware entity operating in a cut-through mode to one or more processing clusters, at least one data field of the one or more data fields being indicative of an operation associated with the data packet; checking, at the integrity checking module 550, an integrity of the segment of the data packet based on the one or more data fields intercepted and parameters corresponding to the operation associated with the data packet; upon detecting an integrity error, modifying at least one data field of the one or more data fields intercepted; and forwarding the one or more data fields to the one or more processing clusters.

Figure 7A:
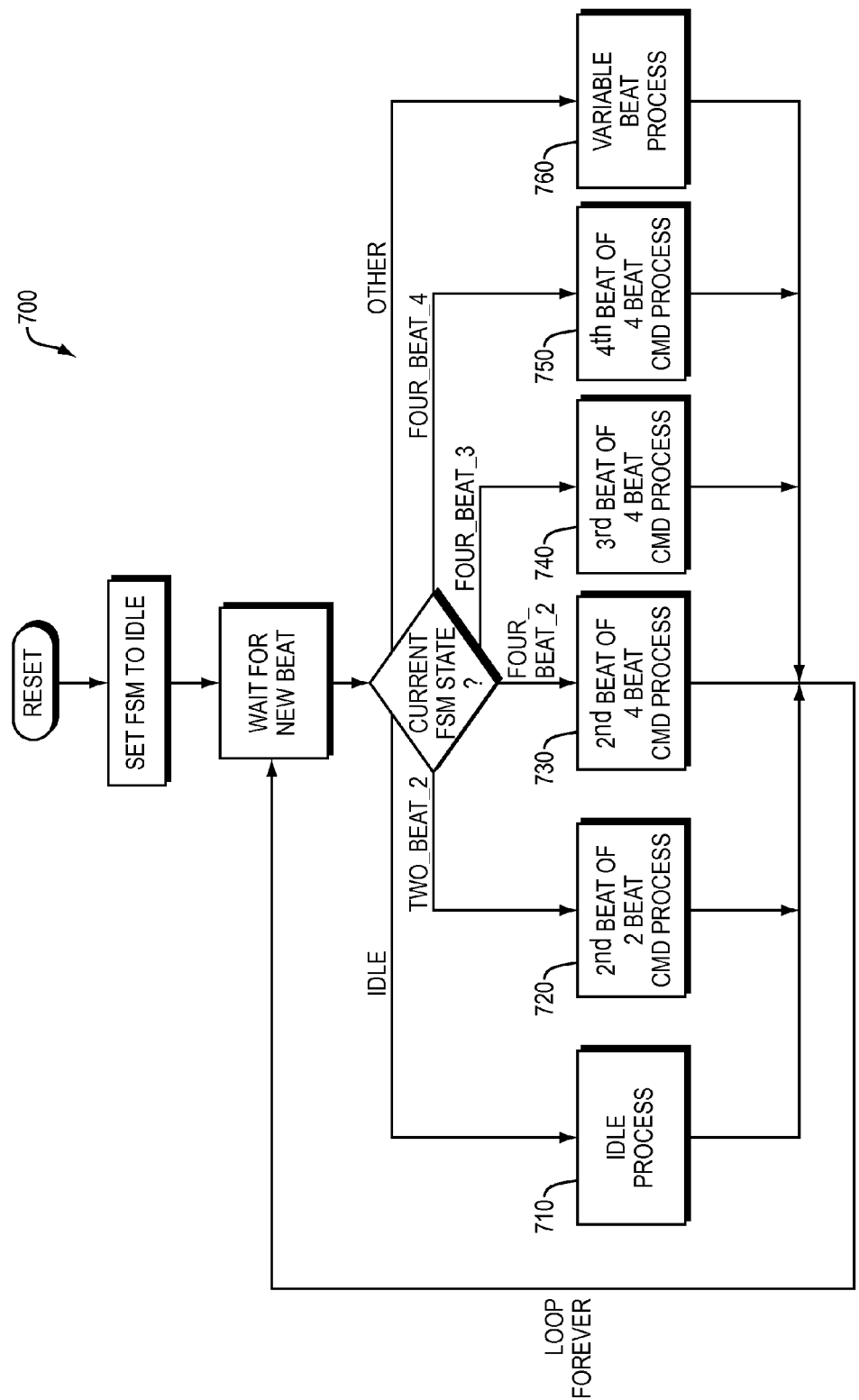
FIGS. 7A-7H illustrate a finite state machine corresponding to a method performed by the integrity checking module, according to at least one example embodiment.

FIGS. 7A-7H illustrate a finite state machine (FSM) 700 corresponding to a method performed by the integrity checking module, according to at least one example embodiment. As shown in FIG. 7A, the method includes multiple processes 710-760 corresponding to different scenarios considered in the FSM described in FIGS. 7A-7H. The scenarios assume that the commands recognized by the integrity checking module 550 include a 1-beat command, a 2-beat command, a 4-beat command, and a variable length command.

Figure 7B:
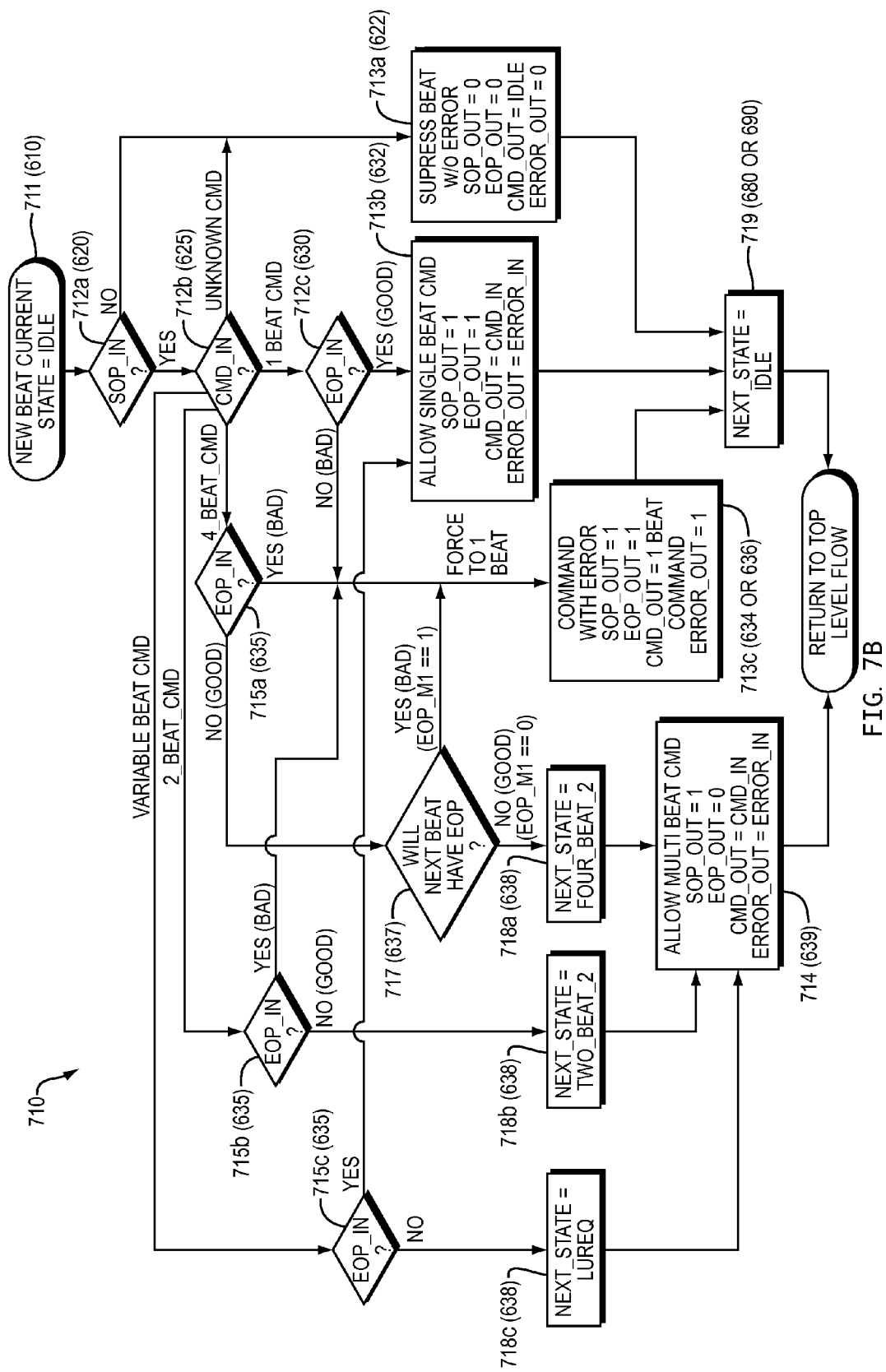

Based on the recognized commands, the processes shown in FIG. 7A include the process 710 corresponding to the case where the FSM starts from an idle state, e.g., S=0 and N=0 as in FIG. 6, and a current beat is detected. The process 710 is shown in FIG. 7B. A person skilled in the art should appreciate the similarity between the process in FIG. 7B and the process corresponding to part of the FSM 600 where N=0. For example, the blocks 715a-c are equivalent to the block 635 in FIG. 6. Also the blocks 712a-c correspond to the blocks 620, 625 and 630 in FIG. 6.

Figure 7C:
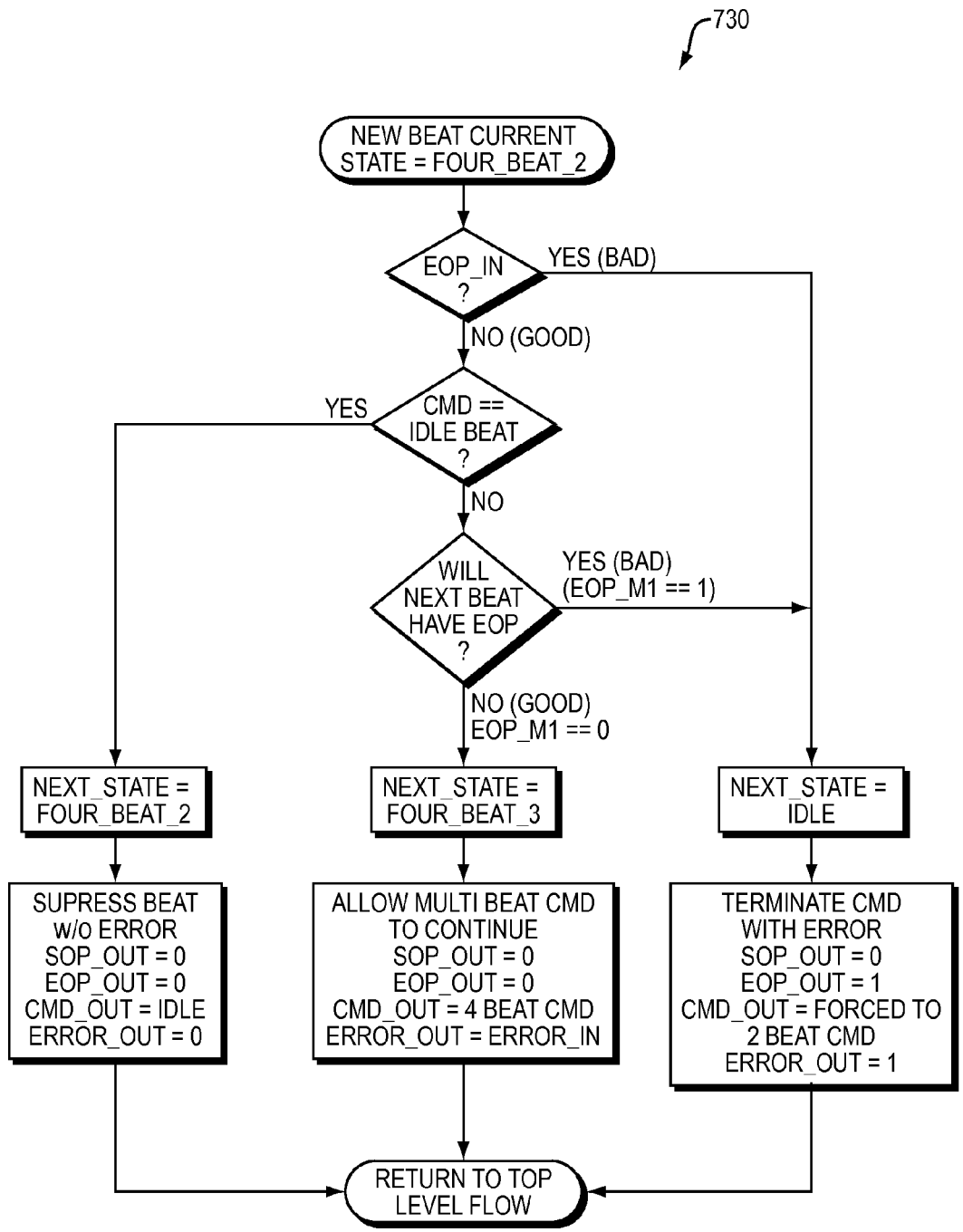
Figure 7D:
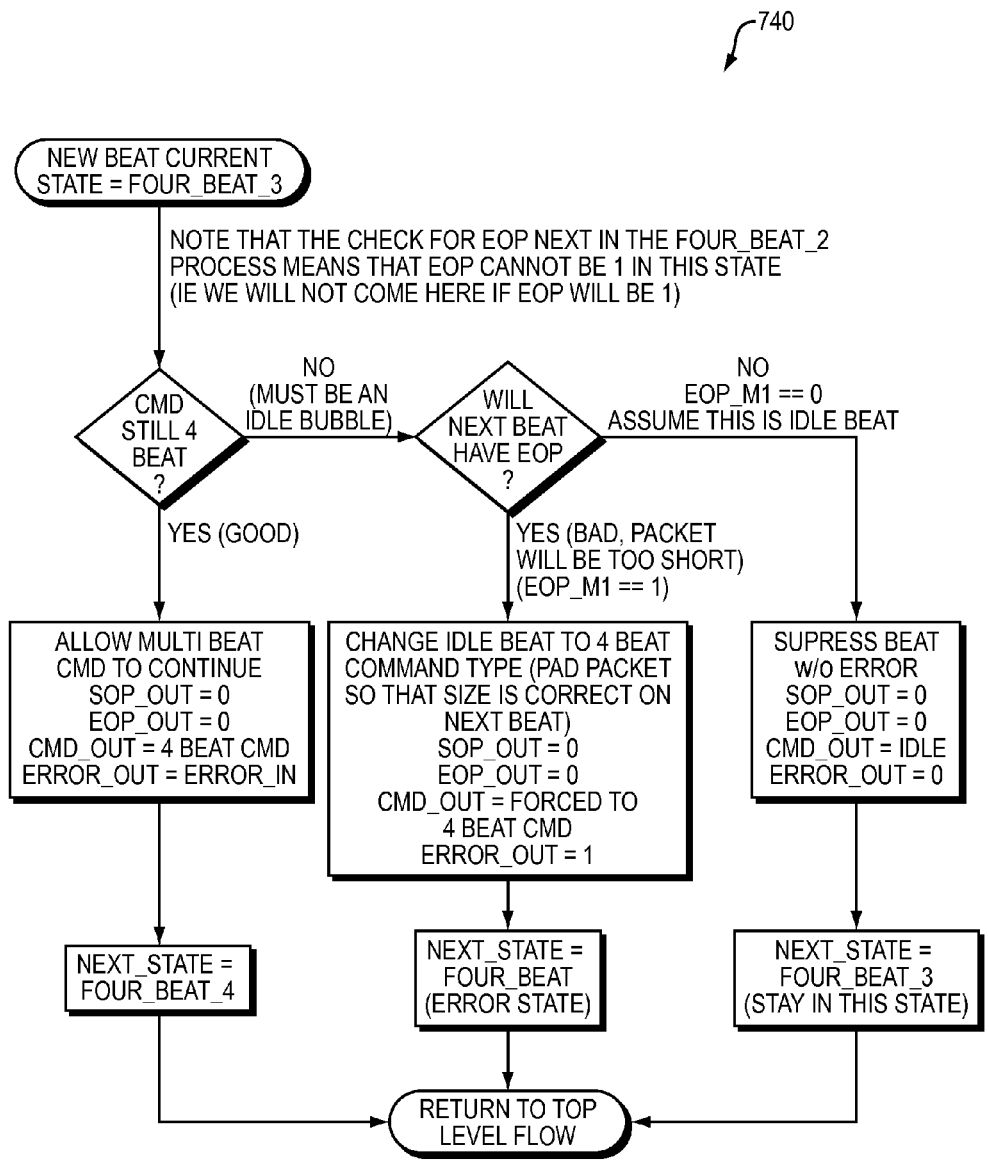
Figure 7E:
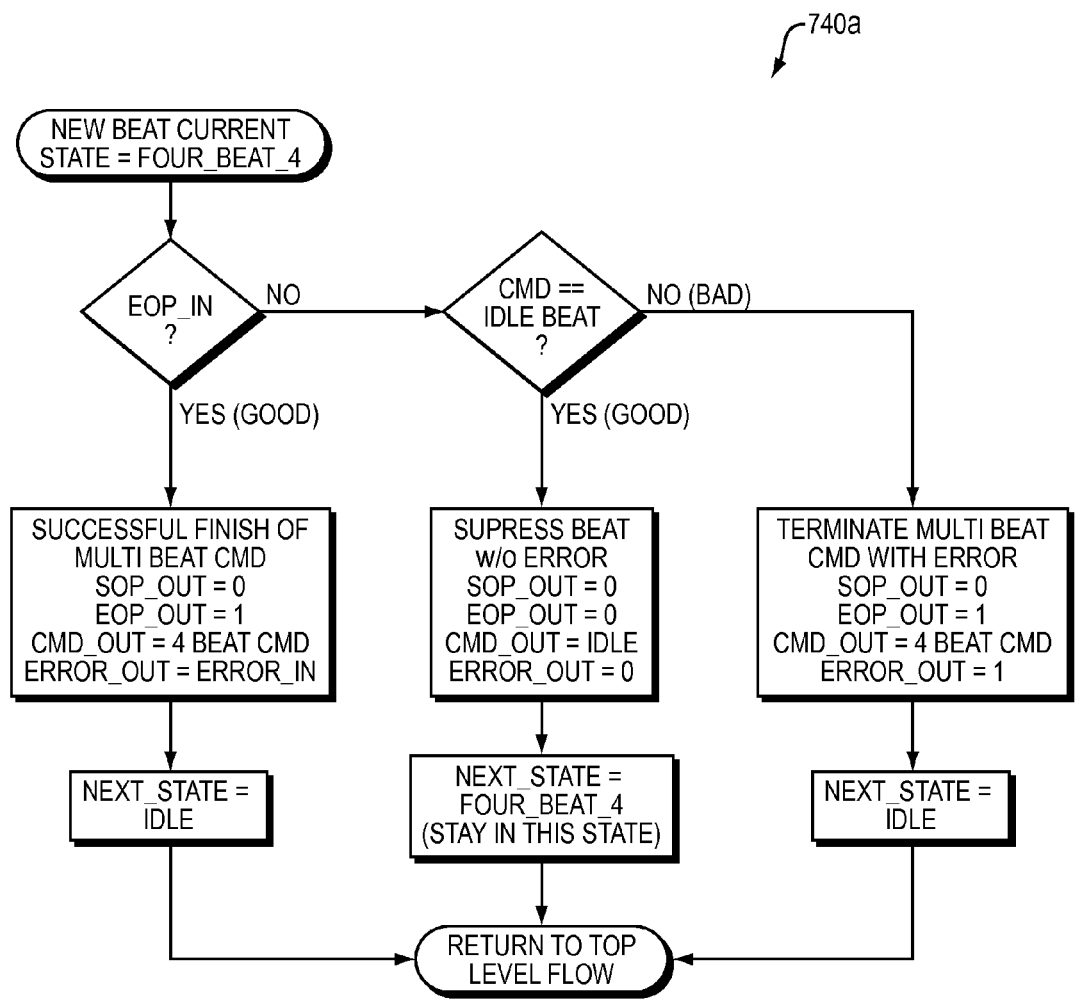
Figure 7F:
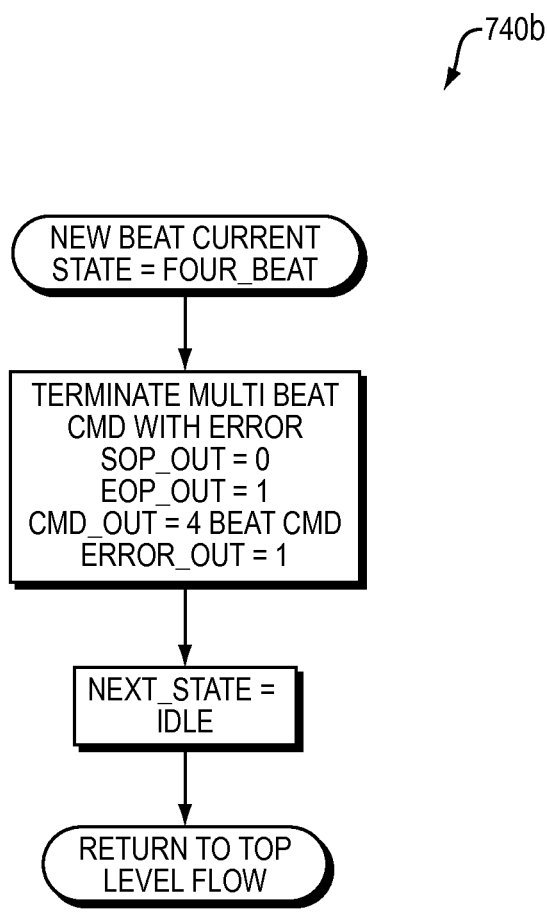
Figure 7G:
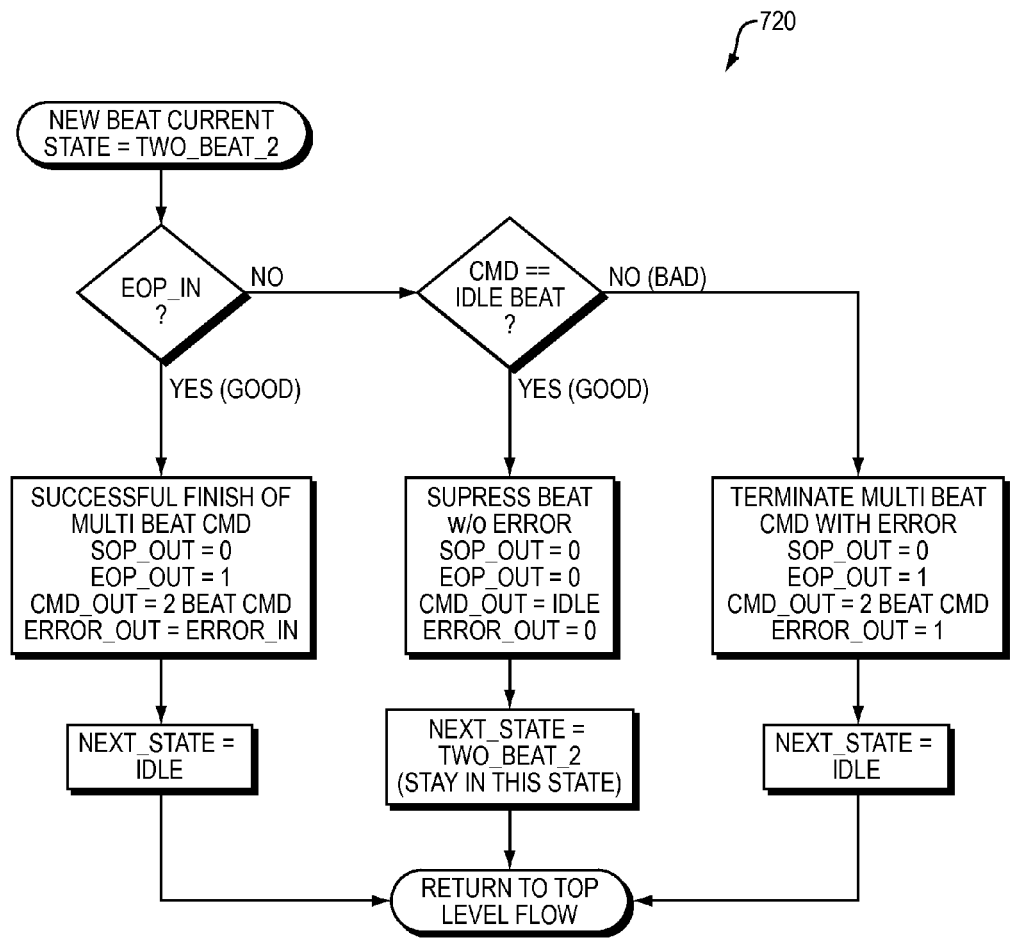
Figure 7H:
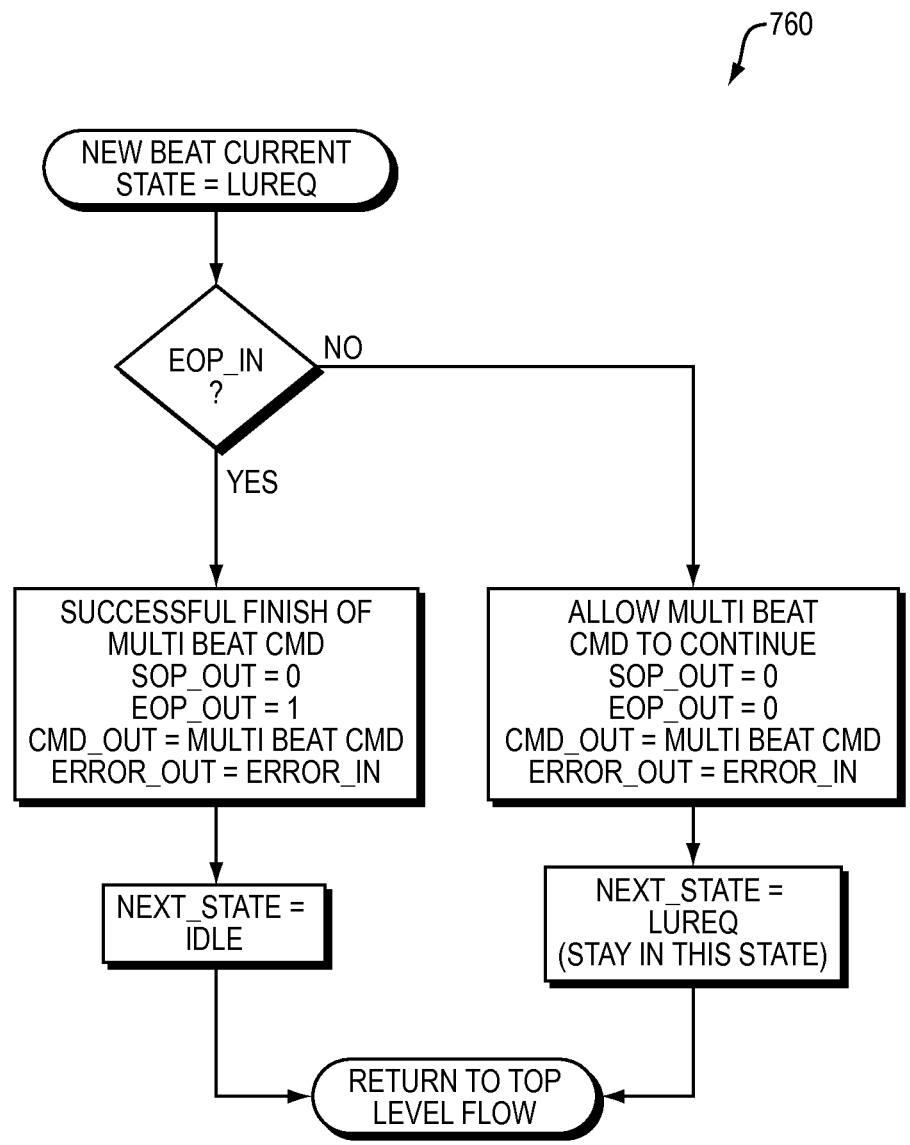

FIGS. 7C and 7D describe, respectively, the processes 730 and 740 performed when a second and third beat of a 4-beat command are received. FIGS. 7E and 7F describe the process 750 for, respectively, a valid and erroneous received fourth beat of a 4-beat command is received. FIG. 7G describes the process 720 performed when a second beat of a 2-beat command is received. FIG. 7H represents the process corresponding to handling a k-th beat of a variable length command.

A person skilled in the art should appreciate that integrity checking module 550 may be employed in a variety of processing systems including, but not restricted to, a networks search processor 202, a general purpose processor, a digital signal processing (DSP) or other processor.

While this invention has been particularly shown and described with references to example embodiments thereof, it will be understood by those skilled in the art that various changes in form and details may be made therein without departing from the scope of the invention encompassed by the appended claims.

What is claimed is:

1. A method of handling data packets within a processor, the method comprising:
   intercepting, by a hardware packet integrity checking module, one or more data fields associated with a current segment of a data packet being forwarded from a first hardware entity operating in a cut-through mode to one or more processing clusters, at least one data field of the one or more data fields being indicative of an operation associated with the data;

checking, at the hardware packet integrity checking module, an integrity of the current segment of the data packet based on the one or more data fields and parameters corresponding to the operation associated with the data packet to detect an integrity error;

modifying at least one data field of the one or more data fields upon detecting the integrity error; and forwarding the one or more data fields to the one or more processing clusters.

2. A method according to claim 1, wherein at least one data field of the one or more data fields is indicative of an end of packet signal.

3. A method according to claim 2, wherein the operation is associated with a respective size of the data packet.

4. A method according to claim 1, wherein at least one data field of the one or more data fields is indicative of a start of packet signal.

5. A method according to claim 1, wherein at least one data field of the one or more data fields is indicative of an error signal.

6. A method according to claim 1, wherein detecting an integrity error includes detecting an error indicative of a missing end of packet (EOP) indication in the segment, and modifying at least one data field includes:

inserting the EOP indication by modifying a corresponding first data field; and inserting an indication of an error by modifying a corresponding second data field.

7. A method according to claim 1, wherein the current segment is the first segment in the data packet, detecting an integrity error includes detecting an error indicative of a missing start of packet (SOP) indication in the segment, and modifying at least one data field includes:

inserting the SOP indication by modifying a corresponding first data field;

inserting an end of packet (EOP) indication by modifying a corresponding second data field; and inserting an indication of an error by modifying a corresponding third data field.

8. A method according to claim 1, modifying at least one data field includes modifying the at least one data field to cause the segment to be suppressed.

9. A method according to claim 1, further comprising intercepting one or more data fields associated with a next segment.

10. A method according to claim 9, wherein checking the integrity of the current segment includes checking the integrity based on the one or more data fields associated with the current segment, parameters corresponding to the operation associated with the data packet, and the one or more data fields associated with the next segment.

11. A method according to claim 1, wherein modifying at least one data field includes:

inserting an indication of an error by modifying a corresponding first data field, inserting an end of packet (EOP) indication by modifying a corresponding second data field, and modifying the data field indicative of the operation associated with the data packet; or inserting an indication of an error by modifying a corresponding first data field, inserting an EOP indication by modifying a corresponding second data field, and generating at least one beat for forwarding to the one or more processing clusters.

12. A hardware integrity checking module for handling data packets being sent from a first hardware entity operating in a cut-through mode to a second entity, the hardware integrity checking module comprises:

a logic circuit configured to:

intercept one or more data fields associated with a current segment of a data packet being forwarded from the first hardware entity to the second entity, at least one data field of the one or more data fields being indicative of an operation associated with the data packet;

check an integrity of the current segment of the data packet based on the one or more data fields and parameters corresponding to the operation associated with the data packet to detect an integrity error;

modifying at least one data field of the one or more data fields upon detecting the integrity error; and forward the one or more data fields to the one or more processing clusters.

13. A hardware integrity checking module according to claim 12, wherein at least one data field of the one or more data fields is indicative of an end of packet signal.

14. A hardware integrity checking module according to claim 13, wherein the operation is associated with a respective size of the data packet.

15. A hardware integrity checking module according to claim 12, wherein at least one data field of the one or more data fields is indicative of a start of packet signal.

16. A hardware integrity checking module according to claim 12, wherein at least one data field of the one or more data fields is indicative of an error signal.

17. A hardware integrity checking module according to claim 12, wherein the logic circuit is configured to modify at least one data field upon detecting an integrity error that includes detecting an error indicative of a missing end of packet (EOP) indication in the segment, the modifying including:

inserting the EOP indication by modifying a corresponding first data field; and inserting an indication of an error by modifying a corresponding second data field.

18. A hardware integrity checking module according to claim 12, wherein the current segment is the first segment in the data packet, and the logic circuit is configured to modify at least one data field upon detecting an integrity error that includes detecting an error indicative of a missing start of packet (SOP) indication in the segment, the modifying including:

inserting the SOP indication by modifying a corresponding first data field;

inserting an end of packet (EOP) indication by modifying a corresponding second data field; and inserting an indication of an error by modifying a corresponding third data field.

19. A hardware integrity checking module according to claim 12, wherein the logic circuit configured to modify at least one data field includes modifying the at least one data field to cause the segment to be suppressed.

20. A hardware integrity checking module according to claim 12, wherein the logic circuit is further configured to intercept one or more data fields associated with a next segment.

21. A hardware integrity checking module according to claim 20, wherein the logic circuit configured to check the integrity of the current segment includes checking the integrity based on the one or more data fields associated with the current segment, parameters corresponding to the operation associated with the data packet, and the one or more data fields associated with the next segment.

22. A hardware integrity checking module according to claim 12, wherein the logic circuit is configured to:
insert an indication of an error by modifying a corresponding first data field, insert an end of packet (EOP) indication by modifying a corresponding second data field, and modify the data field indicative of the operation associated with the data packet; or
insert an indication of an error by modifying a corresponding first data field, insert an EOP indication by modifying a corresponding second data field, and generate at least one beat for forwarding to the one or more processing clusters.

23. Apparatus for handling data packets within a processor, the apparatus comprising:
means for intercepting one or more data fields associated with a current segment of a data packet being forwarded from a first hardware entity operating in a cut-through mode to one or more processing clusters, at least one data field of the one or more data fields being indicative of an operation associated with the data;
means for checking an integrity of the current segment of the data packet based on the one or more data fields and parameters corresponding to the operation associated with the data packet to detect an integrity error;
means for modifying at least one data field of the one or more data fields upon detecting the integrity error; and
means for forwarding the one or more data fields to the one or more processing clusters.

* * * * *